United States Patent
Son et al.

(10) Patent No.: US 6,912,074 B1
(45) Date of Patent: Jun. 28, 2005

(54) METHOD OF PRODUCING A BIG SIZE HOLOGRAPHIC PROJECTION SCREEN FOR DISPLAYING A THREE-DIMENSIONAL COLOR IMAGES WITHOUT COLOR DETERIORATION

(75) Inventors: Jung-Young Son, Gyeonggi-do (KR); Vladimir I. Bobrinev, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 10/911,825

(22) Filed: Aug. 4, 2004

(51) Int. Cl.⁷ .......................... G03H 1/02; G03B 21/56
(52) U.S. Cl. ........................................ 359/28; 359/443
(58) Field of Search .............................. 359/1, 10, 15, 359/22, 28, 30, 443, 454, 462

(56) References Cited

U.S. PATENT DOCUMENTS 4,799,739 A * 1/1989 Newswanger ................ 359/15
6,211,977 B1 4/2001 Son et al.
6,735,001 B2 * 5/2004 Nakashima .................. 359/454
2001/0001579 A1 * 5/2001 Kanda et al. ................ 359/443

* cited by examiner

Primary Examiner—Christopher Mahoney
(74) Attorney, Agent, or Firm—Perkins Coie LLP

(57) ABSTRACT

A method of producing a big size holographic screen for projection of the stereoscopic or multiview 3-dimensional color images is proposed, where a narrow and elongate slit-shaped diffuser is recorded on the hologram as an object to ensure the well defined viewing zone forming in course of the image projection. As compared with the previous art the diffuser length is increased by the calculated value to provide undistorted color reproduction on whole screen surface. The parameters required for the recording of the holographic screen, including the position of a photoplate with respect to the diffuser, the position of a reference wave point source with respect to the diffuser, the distance from which an image is observed and so on are determined by consideration of the phase relationships between the reference, object, projector and reconstructed waves on the photoplate surface.

9 Claims, 5 Drawing Sheets

METHOD OF PRODUCING A BIG SIZE HOLOGRAPHIC PROJECTION SCREEN FOR DISPLAYING A THREE-DIMENSIONAL COLOR IMAGES WITHOUT COLOR DETERIORATION

BACKGROUND OF THE INVENTION

1. Field of Invention

The invention relates generally to an application technique using holography, and more particularly, to a method of producing a projection holographic screen for displaying a three-dimensional color images.

2. Description of the Related Art

A projection holographic screen is a kind of holographic optical element that serves as a autostereoscopic image display screen which, being illuminated by the image projector, collects the image light into well defined viewing zones so that viewer can observe the displayed image if an eye is disposed within a viewing zone. To display the stereoscopic or multiview image it is necessary to use correspondingly two or more projectors each of them originating its own viewing zone. These viewing zones should be narrow enough to deliver one view of image to one viewer's eye and the viewing zone centers should be spaced apart from each other by an eye-to-eye distance (about 6.5 cm).

The method of producing the transmission type holographic screen has been proposed in the patent U.S. Pat. No. 6,211,977. For recording the holographic screen an elongate and narrow diff-using slit was used as an object and the diffuser position relative to the photoplate is mathematically set to make the light, being diffracted into viewing zone, to possess all spectral components within a visible range. The diffuser should be in form of the narrow slit to provide the sharp separation of the viewing zones for the left and right eyes, the slit should be inclined to the photoplate surface to provide appropriate focusing of all spectral components in the viewing zone, and the length of the slit should be big enough to provide overlapping in the viewing zone all spectral components of the visible spectrum.

The drawback of the described method consists of deterioration of the image coloration in the screen corners when screen size becomes big enough.

SUMMARY OF THE INVENTION

It is therefore an object of the present invention to provide a method of producing a large aperture holographic screen for displaying a stereoscopic or multiview color image without big size optical elements in the screen recording setup, which is optimized by analyzing the optimum conditions of the image reproduction process via the produced holographic screen.

According to the preferred embodiment of the present invention, there is provided an apparatus for producing a holographic screen for displaying a stereoscopic or multiview color image by recording interference patterns on a photoplate located on xy-plane of three dimensional space, comprising: a laser for generating a light beam, a beam splitter for dividing the light beam into a reference beam and an object beam, a first mirror for reflecting the reference beam, a first lens locating on z-axis for focusing the reflected reference beam to form a diverging reference beam for the photoplate, a second mirror for reflecting the object beam, a second lens for forming the reflected object beam, and a diffuser having a length of $Z_{22}-Z_{21}$ disposed perpendicular to the photoplate and illuminated by said second lens, wherein $Z_{21}$, distance to the nearest point of the diffuser from xy-place, $Z_{22}$, distance to the farthest point from xy-plane, are calculated from following equations:

$$Z_{21} = \sqrt{\dfrac{1}{\left[\dfrac{1}{\sqrt{Z_1^2+\rho_{\max}^2}} + \dfrac{\lambda_1}{\lambda_{21}}\left(\dfrac{1}{\sqrt{Z_3^2+\rho_{\max}^2}} + \dfrac{1}{\sqrt{Z_4^2+\rho_{\max}^2}}\right)\right]^2} - \rho_{\max}^2} \quad (7)$$

$$Z_{22} = \dfrac{1}{\dfrac{1}{Z_1} + \dfrac{\lambda_1}{\lambda_{22}}\left(\dfrac{1}{Z_3} + \dfrac{1}{Z_4}\right)} \quad (8)$$

where $\lambda_1$ is the wavelength of the laser used for the holographic screen recording, $\lambda_{21}$ is the shortest wavelength of the displayed image, $_{22}$ is the longest wavelength of the displayed image, $Z_1$ is distance to the reference beam source from the XY-plane in the recording setup, $Z_3$ is distance from the projector to the holographic screen in the image projection setup, $Z_4$ is distance from the screen to the focusing point of the diffracted beams, and $\rho_{max}$ is distance from Z-axis of the farthermost point of the photoplate.

According to another preferred embodiment of the present invention, there is provided an apparatus for displaying stereoscopic or multiview color image on a holographic screen locating on xy-plane of three dimensional space, comprising: a projector for producing an image projection beam, and a holographic screen on x-y plane of a three-dimensional space, center of said holographic screen being disposed on y-axis, for diffracting the image projection beam to be collected on a focusing point, whereby the stereoscopic or multiview color image can be displayed on the focusing point at a distance $Z_4$ from said holographic screen by said projector disposed at a distance $Z_3$ from said holographic screen, if a view's eyes are placed at viewing zones being composed of superposed diffuser's real images of the different colors, wherein said holographic screen is made by using a narrow and elongate slit-shaped diffuser having a length of $Z_{22}-Z_{21}$ disposed perpendicularly to the holographic screen, wherein $Z_{21}$, distance to the nearest point of the diffuser from xy-place, $Z_{22}$, distance to the farthest point from xy-plane, are calculated from following equations:

$$Z_{21} = \sqrt{\dfrac{1}{\left[\dfrac{1}{\sqrt{Z_1^2+\rho_{\max}^2}} + \dfrac{\lambda_1}{\lambda_{21}}\left(\dfrac{1}{\sqrt{Z_3^2+\rho_{\max}^2}} + \dfrac{1}{\sqrt{Z_4^2+\rho_{\max}^2}}\right)\right]^2} - \rho_{\max}^2} \quad (7)$$

$$Z_{22} = \dfrac{1}{\dfrac{1}{Z_1} + \dfrac{\lambda_1}{\lambda_{22}}\left(\dfrac{1}{Z_3} + \dfrac{1}{Z_4}\right)} \quad (8)$$

where $\lambda_1$ is the wavelength of the laser used for the holographic screen recording, $\lambda_{21}$ is the shortest wavelength of the displayed image, $\lambda_{22}$ is the longest wavelength of the displayed image, $Z_1$ is distance to the reference beam source from the XY-plane in the recording setup, $Z_3$ is distance from the projector to the holographic screen in the image projection setup, $Z_4$ is distance from the holographic screen to the focusing point of the diffracted beams, and $\rho_{max}$ is distance from Z-axis of the farthermost point of the holographic screen.

According to still another preferred embodiment of the present invention, there is provided a method of producing a holographic screen for displaying a stereoscopic or multiview color image, comprising: placing a photoplate on the x-y plane of a three-dimensional space, center of the photoplate being disposed on the y-axis on the distance of H/2+h from the origin of a three-dimensional space, wherein H is the photoplate height (size in the y-direction) and h is distance of the photoplate boundary from the origin, splitting the laser beam into a reference beam and object beam, both beams being used to illuminate the photoplate surface, shaping the reference beam as spherical wave diverging from the point on the z-axis which is located a distance $Z_1$ from the origin of a three-dimensional space, shaping the object beam so to illuminate the photoplate through a elongated narrow strip-shaped diffuser disposed precisely along the z-axis, and recording the interference pattern, which is arising as a result of superposition of the reference wave with an object wave from diffuser on the photoplate, wherein to provide displaying of the color image in the bandwidth from $\lambda_{21}$ (shortest wavelength) up to $\lambda_{22}$ (the longest wavelength), the coordinates $Z_{21}$ and $Z_{22}$ of the diffuser end points are calculated from the following equations:

$$Z_{21} = \sqrt{\dfrac{1}{\left[\dfrac{1}{\sqrt{Z_1^2+\rho_{max}^2}} + \dfrac{\lambda_1}{\lambda_{21}}\left(\dfrac{1}{\sqrt{Z_3^2+\rho_{max}^2}} + \dfrac{1}{\sqrt{Z_4^2+\rho_{max}^2}}\right)\right]^2} - \rho_{max}^2} \quad (7)$$

$$Z_{22} = \dfrac{1}{\dfrac{1}{Z_1} + \dfrac{\lambda_1}{\lambda_{22}}\left(\dfrac{1}{Z_3} + \dfrac{1}{Z_4}\right)} \quad (8)$$

where $\lambda_1$ is the wavelength of the laser used for the screen recording, $Z_3$ is distance from the projector to the screen in the image projection setup, $Z_4$ is distance from the holographic screen to a focusing point of the diffracted beams, and $\rho_{max}$ is distance from Z-axis of the farthermost point of the photoplate.

According to still another preferred embodiment of the present invention, there is provided a method for producing a holographic screen by using a diffuser disposed along z-axis of three dimensional space and perpendicular to a photoplate on the xy plane of a three dimensional space, comprising: determining a wavelength $\lambda_1$ of laser beam used for a holographic screen recording to setup and a distance Z1 to a reference beam source from xy plane, determining a shortest wavelength $\lambda_{21}$ and a longest wavelength $\lambda_{22}$ of an image to be displayed, a distance $Z_3$ from a projector to the holographic screen, and a distance $Z_4$ from the holographic screen to a focusing point of diffracted beams in an image projection setup, calculating a distance $\rho_{max}$ from Z-axis of the farthermost point of the photoplate with size of B×H, wherein center of the photoplate is disposed is a on the y-axis on the distance of H/2+h from the origin of the three-dimensional space, where H is the photoplate height (size in the y-direction) and h is distance of the photoplate boundary from the origin, calculating a distance $Z_{21}$ to the nearest point of the diffuser from xy-place and a distance $Z_{22}$ to the farthest point from xy plane by using following equations:

$$Z_{21} = \sqrt{\dfrac{1}{\left[\dfrac{1}{\sqrt{Z_1^2+\rho_{max}^2}} + \dfrac{\lambda_1}{\lambda_{21}}\left(\dfrac{1}{\sqrt{Z_3^2+\rho_{max}^2}} + \dfrac{1}{\sqrt{Z_4^2+\rho_{max}^2}}\right)\right]^2} - \rho_{max}^2} \quad (7)$$

$$Z_{22} = \dfrac{1}{\dfrac{1}{Z_1} + \dfrac{\lambda_1}{\lambda_{22}}\left(\dfrac{1}{Z_3} + \dfrac{1}{Z_4}\right)} \quad (8)$$

recording interference patterns on the photoplate by using the diffuser disposed along z-axis from $Z_{21}$ to $Z_{22}$ to produce a holographic screen.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

Figure 1:
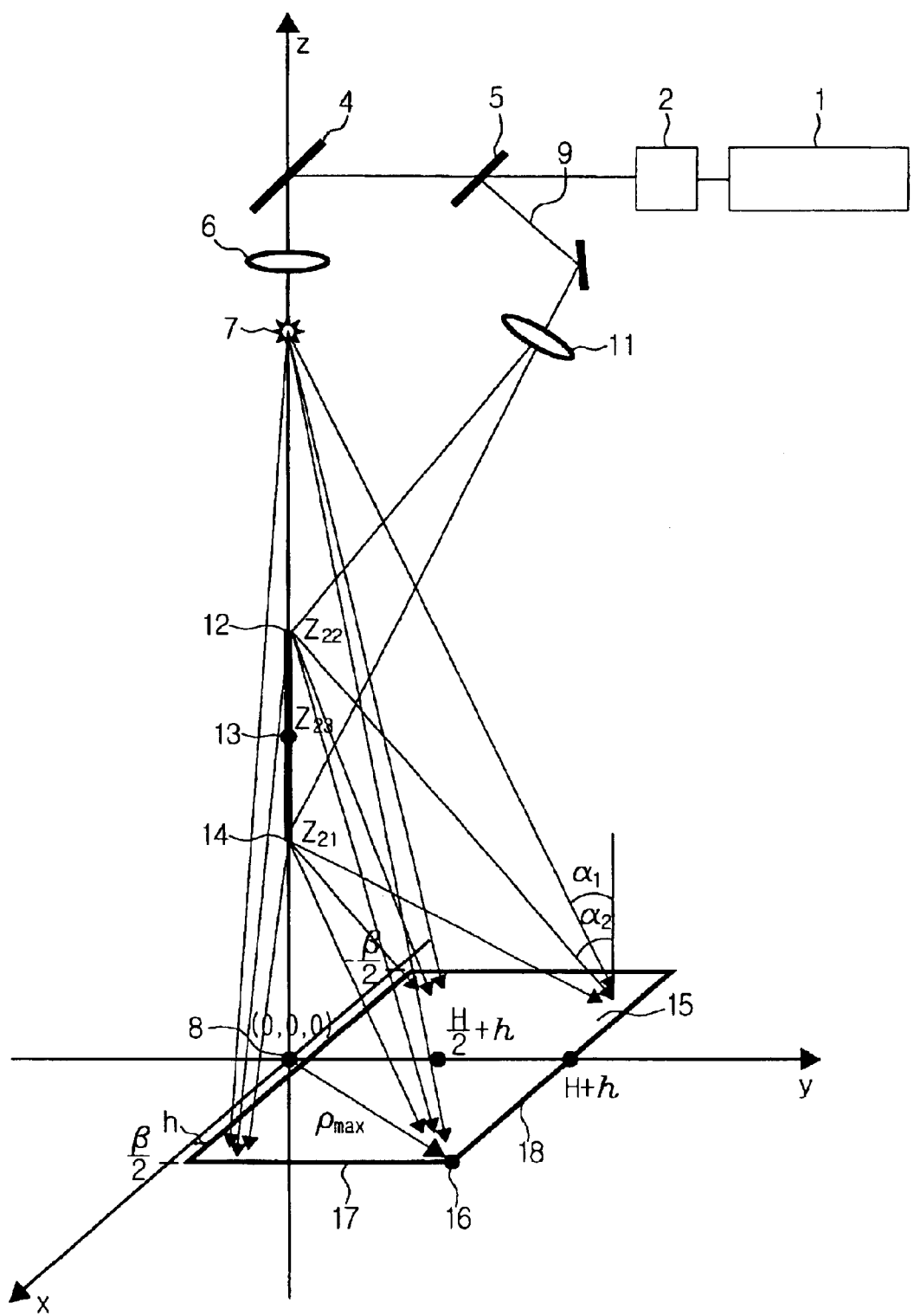
FIG. 1 is a schematic view showing an optical arrangement for producing a holographic screen according to the present invention.

The present invention will be described in detail by way of a preferred embodiment with reference to accompanying drawings, in which like reference numerals are used to identify the same or similar parts.

FIG. 1 is a schematic view showing an optical arrangement for producing a holographic screen according to the present invention. As shown on FIG. 1, a light beam from laser 1 after shutter 2 is divided into two beams by the beam-splitter 3. One of the obtained beams, namely reference beam 5 is reflected from the mirror 4 and focused by the lens 6 to the point 7 on the z-axis with coordinate $Z_1$ to form a diverging reference beam for the holographic screen recording on the photoplate 15. The coordinate system origin is disposed in the point 8. The photoplate with size of B×H (B is the photoplate width and H is its height) is disposed in the xy-plane and centered to the y-axis with coordinate y=H/2+h, where h is distance of the photoplate boundary from the origin. Second beam after beam splitter 3, namely object beam 9, after reflection from mirror 10 is formed by the lens 11 so as to illuminate the diffuser 13, the slit-shaped diffuser made of ground glass. The diffuser is disposed along the straight line, namely z-axis, which is perpendicular to the surface of the photoplate. This line is considered as the system optical axis. The diffuser end points positions are 12 (the farthest point from the photoplate) and 14 (the nearest point to the photoplate). 17 and 18 are correspondingly short side and long side of the photoplate. Arbitrary point of the photoplate is distant by $\rho$ from the coordinate origin. 16 is the most distant from the coordinate origin point of the photoplate, the distance is $\rho_{max}$.

Figure 2:
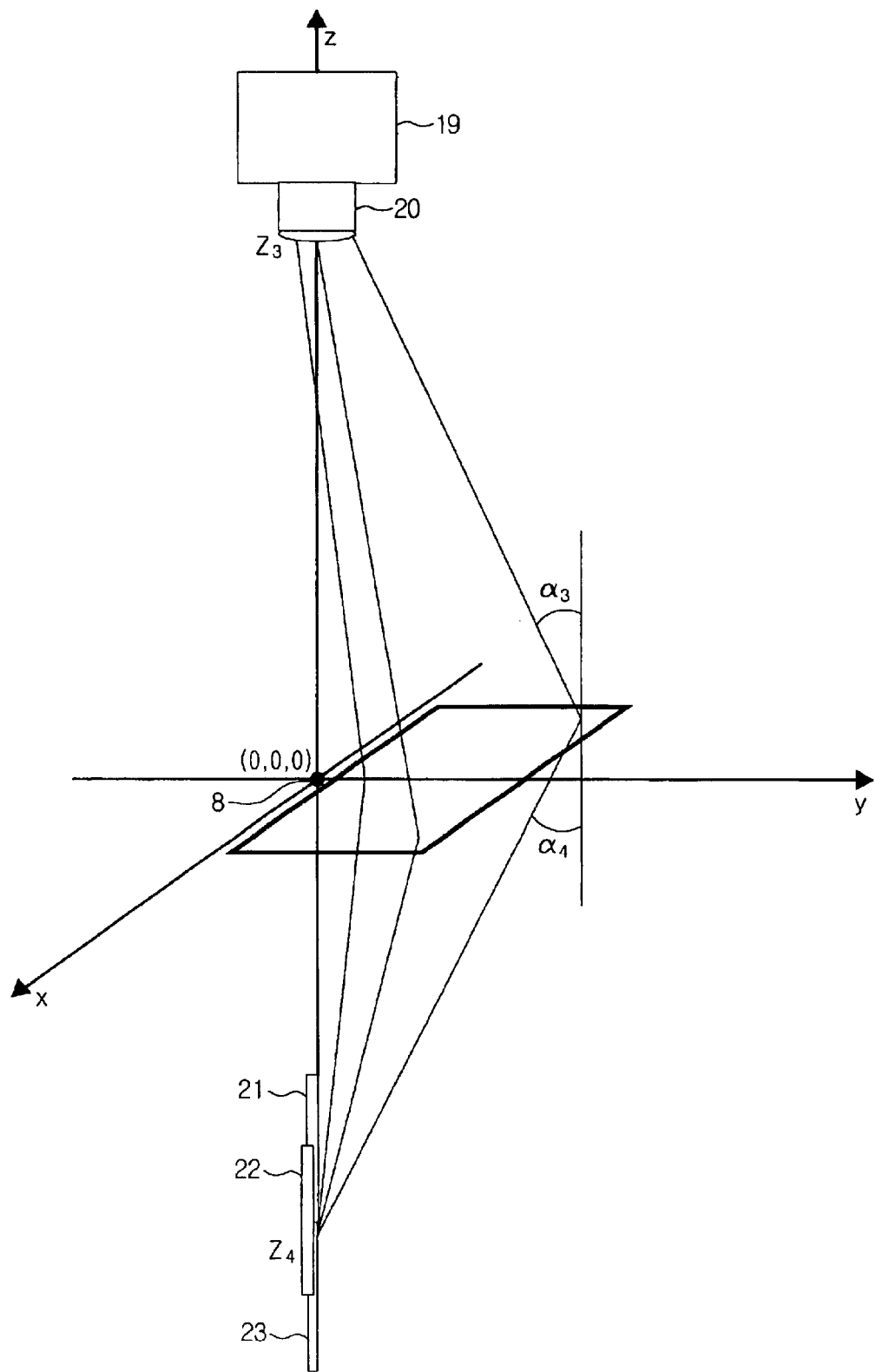
FIG. 2 is a schematic view showing an optical arrangement for displaying image on the holographic screen.

In the FIG. 2 the image projection system and the viewing zone forming are shown when the holographic screen as produced in the setup of FIG. 1 is illuminated by the projector light.

The projector 19 with the exit pupil 20 is used for projection the image to be displayed on the screen 15. Distance of the projector from the hologram plane is $Z_3$. Being diffracted by the holographic screen the projector's light is not scattered randomly, but is collected to produce in the space image of diffuser. As a result the bright image, projected on the screen, can be seen only if the viewer's eye is disposed in the diffuser image. Because of the screen dispersion the red image of the diffuser 21 will be diffracted on the bigger angle and will be disposed more close to the screen, than green image 22 or blue one 23. If the screen recording scheme is optimal, the diffuser images of all of the colors are overlapped in the vicinity of the point $Z_4$ and the full color image on the screen can be seen by the eye disposed in the point $Z_4$.

The problem consists of the recording setup optimization so as to provide some domain in the space, where all color images of the diffuser will be overlapped. It is fulfilled in the present invention by means of appropriate selection of the diffuser length and its position in the recording setup.

Now we will derive the relations between the parameters of the recording setup and the image projection system, which have to be satisfied to produce the holographic screen with the specified characteristics.

As it is shown in the FIG. 1 the point source of the reference beam and the diffuser are disposed along the straight line which is perpendicular to the surface of the photoplate. This line is considered as the system optical axis. As a result the interference fringes are recorded on the photoplate as the concentric rings and the common center of the rings is disposed in the point where the optical axis intersects with the photoplate surface. It is clear that when the chemically processed hologram will be illuminated by the projector, the diffracted beams will be collected on the same axis.

The distance to the focusing point for the different rings can be calculated as follows.

There will be used the next designations for calculations: $\lambda_1$ is the wavelength of the laser used for the screen recording, $\lambda_{21}$ is the shortest wavelength of the displayed image, $\lambda_{22}$ is the longest wavelength of the displayed image, $Z_1$ is distance to the reference beam source from the XY-plane in the recording setup, $Z_{21}$ is distance to the nearest point of the diffuser, $Z_{22}$ is distance to the farthest point, $Z_3$ is distance from the projector to the screen in the image projection setup, $Z_4$ is distance from the screen to the focusing point of the diffracted beams.

Period d of the interference pattern which is recorded on the photoplate in the setup of FIG. 1 can be calculated according to the equation:

$$\sin\alpha_2 - \sin\alpha_1 = \frac{\lambda_1}{d} \quad (1)$$

Where $\alpha_2$ is incidence angle of the object beam from diffuser, $\alpha_1$ is incidence angle of the reference beam, $\lambda_1$ is the recording laser wavelength.

The image projection setup with the holographic screen is shown in the FIG. 2. The direction of the diffracted beam which forms the real image of the diffuser can be calculated as follows:

$$\sin\alpha_3 + \sin\alpha_4 = \frac{\lambda_2}{d} = \frac{\lambda_2}{\lambda_1}(\sin\alpha_2 - \sin\alpha_1) \quad (2)$$

Where $\alpha_3$ is incidence angle of the light beam from the projector, $\alpha_4$ is diffraction angle of the output beam, $\lambda_2$ is wavelength of the projector light.

According to the FIG. 1 and FIG. 2

$$\sin\alpha_i = \frac{\rho}{\sqrt{\rho^2 + Z_i^2}} \quad \text{(here } i = 1, 2, 3, 4\text{)} \quad (3)$$

Here $\rho$ is distance of the screen point from the system optical axis.

From (1), (2) and (3) we can get:

$$Z_4 = \sqrt{\frac{1}{\left[\frac{\lambda_2}{\lambda_1}\left(\frac{1}{\sqrt{Z_2^2 + \rho^2}} - \frac{1}{\sqrt{Z_1^2 + \rho^2}}\right) - \frac{1}{\sqrt{Z_3^2 + \rho^2}}\right]^2} - \rho^2} \quad (4)$$

When $\rho \to 0$ the equation (4) is simplified to form:

$$\frac{1}{Z_4} = \frac{\lambda_2}{\lambda_1}\left(\frac{1}{Z_2} - \frac{1}{Z_1}\right) - \frac{1}{Z_3} \quad (5)$$

This equation was used in U.S. Pat. No. 6,211,977 to calculate the diffuser position and size if the values $Z_1$, $Z_3$ and $Z_4$ are given.

Let us consider for example case when $Z_1=350$ cm, $Z_3=250$ cm, $Z_4=200$ cm. Using approximation (5) for $\lambda_1=0.488$ $\mu$ and $\lambda_{21}=0.45\mu$, we will obtain $Z_{21}=79,3$ cm. Analogous for $\lambda_{22}=0.65\mu$, we will obtain $Z_{22}=105$ cm. Values of $Z_2$ for the intermediate wavelengths are disposed between $Z_{21}$ and $Z_{22}$. Therefore in the recording setup the distance from the diffuser to the photoplate should be 79.3 cm and diffuser should be extended up to 105 cm, i.e. its length should be 25.7 cm. Using these values let us find positions of the red and blue images of diffuser for different points of the screen, which are disposed at different distance $\rho$ from the optical axis. To do that, we will calculate value of $Z_4$ for both ends of diffuser image.

Figure 3:
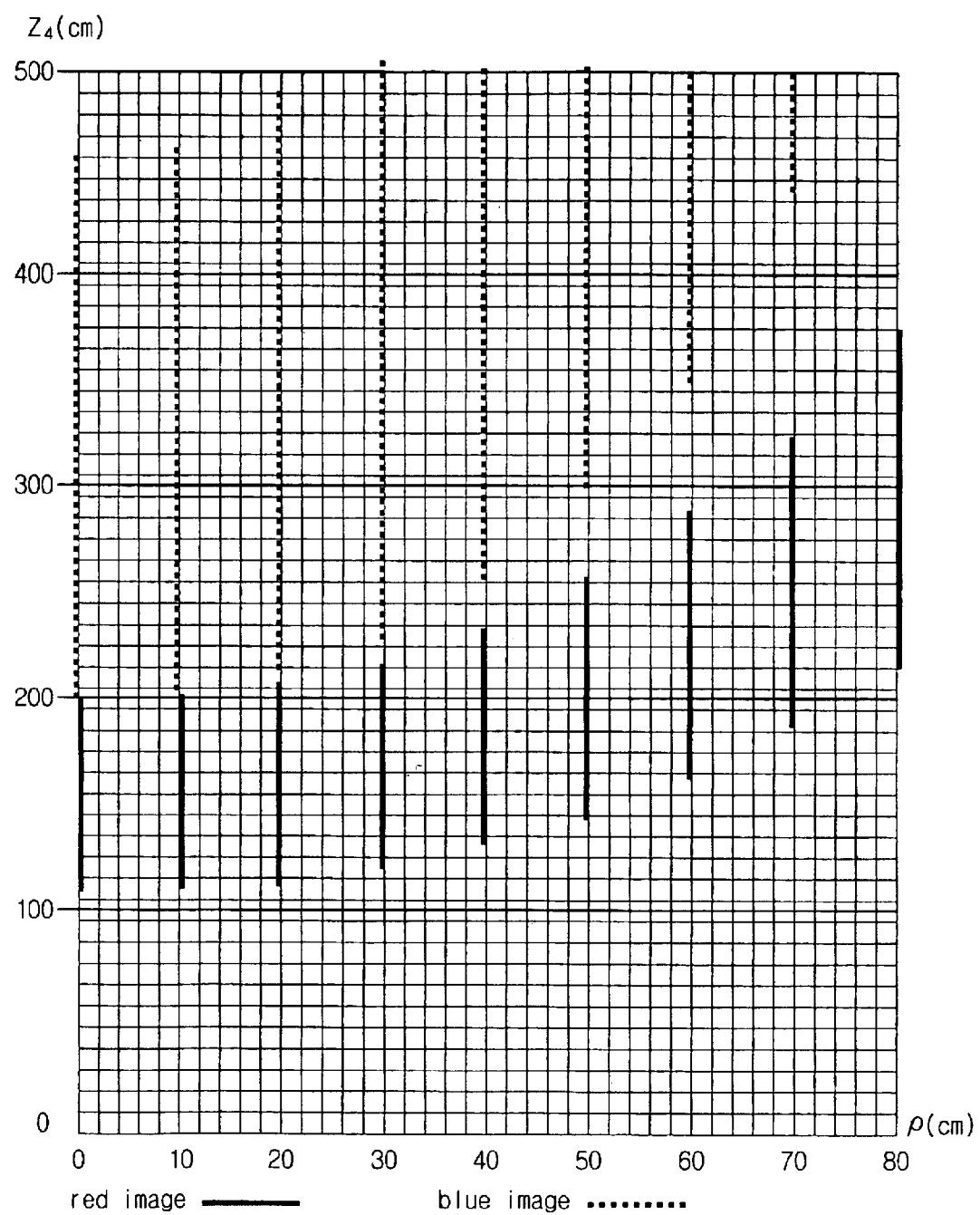
FIG. 3 is showing the viewing zone shift and deformation, when a holographic screen, as produced according to the approximate calculations is illuminated by the image projector.

Calculation results are shown in the Table 1 and FIG. 3:

TABLE 1

| ρ (cm) | | 0 | 10 | 20 | 30 | 40 | 50 | 60 | 70 | 80 |
|---|---|---|---|---|---|---|---|---|---|---|
| Projector wavelength | $Z_2$ | The $Z_4$ value for different colors and end points of the diffuser | | | | | | | | |
| $\lambda_{21} = 0.45 \,\mu\text{m}$ | 79.3 | 200.3 | 203.6 | 213.8 | 231.8 | 259.1 | 298.4 | 353.9 | 432.7 | 547.5 |
|  | 105 | 465.8 | 473.5 | 497.4 | 540.6 | 608.9 | 713.6 | 876.6 | 1145.7 | 1646 |
| $\lambda_{22} = 0.65 \,\mu\text{m}$ | 79.3 | 111.2 | 112.4 | 115.9 | 122.2 | 131.7 | 145.0 | 163.1 | 187 | 218.1 |
|  | 105 | 204.9 | 206.9 | 213 | 223.5 | 239.2 | 261 | 290.3 | 329.2 | 380.6 |

The full-color viewing zone appears in the place where the nearest end of the blue image overlaps with the farthest end of the red image. It is seen from Table 1 and FIG. 3, that distance to the focusing points both for the blue and red lights are increasing when ρ is increased. Therefore position of the viewing zone for the screen parts which are distant from the system optical axis is shifted away the more the bigger is value of ρ. Moreover it is seen that the distant end of the red image is shifted more slowly than the near end of the blue image. It is seen in FIG. 3 that for ρ>20 cm the blue image of the diffuser doesn't overlap with the red image. As a result the spectral band of the image becomes constricted—if viewer is disposed near focusing point of the red light the image is reddish, if he is disposed near focusing point of the blue light the image is bluish.

If the viewer stays in the position of the viewing zone, corresponding to ρ=0, then different rings on the screen will have different coloration because as ρ increases the short-wave border of the focused in the viewing zone light is shifted to more long waves. This shift can be calculated if we will solve the equation 4 for $\lambda_2$.

$$\lambda_2 = \lambda_1 \frac{\frac{1}{\sqrt{Z_3^2 + \rho^2}} + \frac{1}{\sqrt{Z_4^2 + \rho^2}}}{\frac{1}{\sqrt{Z_2^2 + \rho^2}} + \frac{1}{\sqrt{Z_1^2 + \rho^2}}} \quad (6)$$

The calculated values of $\lambda_2$ for the considered setup are presented in the Table 2.

TABLE 2

| ρ (cm) | 0 | 10 | 20 | 30 | 40 | 50 | 60 | 70 | 80 |
|---|---|---|---|---|---|---|---|---|---|
| $\lambda_{2min}$ (μm) | 0.45 | 0.4544 | 0.4665 | 0.4863 | 0.5131 | 0.5462 | 0.585 | 0.6288 | 0.677 |

It is seen that the spectral band of the image becomes more narrow and in the distant from optical axis parts of the screen only red light is present The situation can be improved by appropriate extension of the diffuser length in the screen recording setup. It is clear that first of all it is necessary to retain illumination of the viewing zone by the blue light. This goal can be achieved by extension the diffuser length to the screen i.e. by diminishing distance to the nearest end of the diffuser. The necessary calculations can be done as follows. Analogous to (4) we can get from (1), (2) and (3) equation for $Z_2$:

$$Z_2 = \sqrt{\frac{1}{\left[\left(\frac{1}{\sqrt{Z_1^2 + \rho^2}} + \frac{\lambda_1}{\lambda_2}\left(\frac{1}{\sqrt{Z_3^2 + \rho^2}} + \frac{1}{\sqrt{Z_4^2 + \rho^2}}\right)\right)\right]^2} - \rho^2} \quad (6)$$

Figure 4:
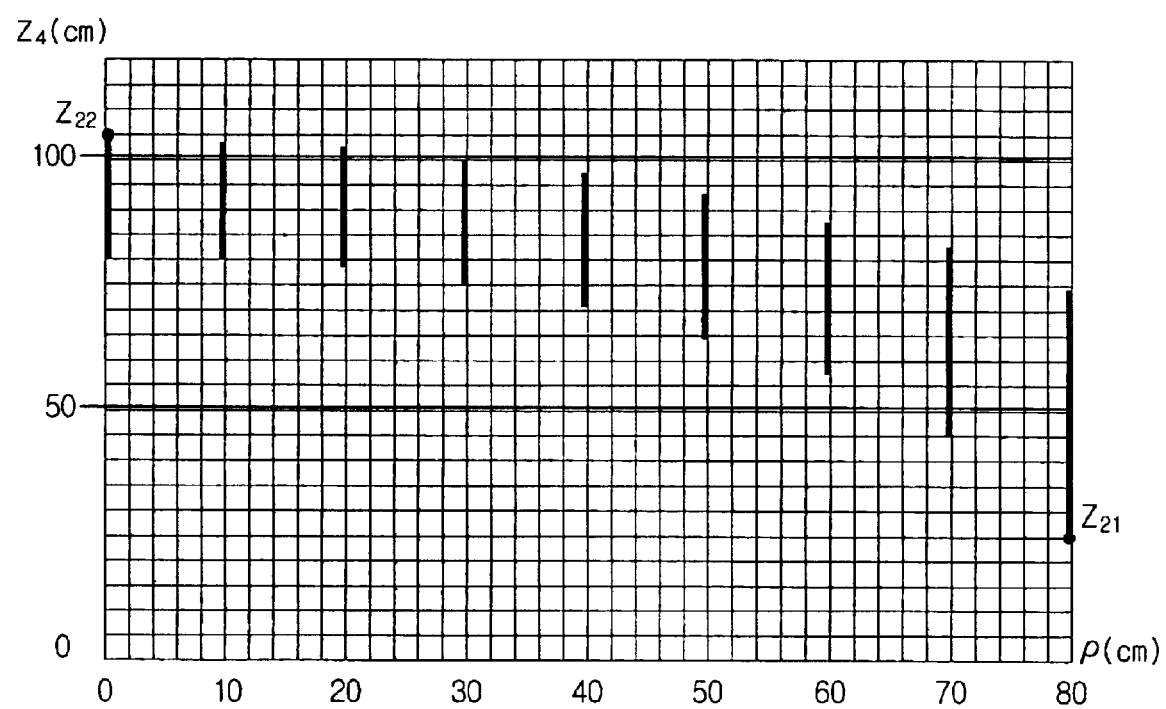
FIG. 4 is showing a necessary diffuser positions to correct the position of the viewing zone according to the present invention.

There are shown in the Table 3 and in FIG. 4 the calculation results of $Z_2$ as function of ρ for the edge wavelengths of the visible light $\lambda_{21}$=0,45μ and $\lambda_{22}$=0,65μ ($Z_1$=350 cm, $Z_3$=250 cm, $Z_4$=200 cm ).

TABLE 3

| | ρ (cm) | 0 | 10 | 20 | 30 | 40 | 50 | 60 | 70 | 80 | 90 | 100 |
|---|---|---|---|---|---|---|---|---|---|---|---|---|
| $Z_2$ (cm) | $\lambda_{21} = 0.45 \,\mu\text{m}$ | 79.3 | 78.7 | 77.0 | 74.1 | 69.7 | 63.7 | 55.6 | 44.0 | 24.5 | — | — |
|  | $\lambda_{22} = 0.65 \,\mu\text{m}$ | 105 | 103.6 | 102.4 | 100.4 | 97.5 | 93.7 | 88.8 | 82.6 | 74.8 | 64.8 | 51.4 |

We can see from table 2 and FIG. 4, that diff-user should be extended to the hologram plate to retain the full-color viewing zone position. The distant end of the screen should be in the same position, namely 105 cm apart. Therefore the coordinate of the farthest point of the diffuser $Z_{22}$ should be calculated by formula (6) with ρ=0 and the coordinate of the nearest point $Z_2$—by the same formula with ρ=$\rho_{max}$:

$$Z_{21} = \sqrt{\frac{1}{\left[\left(\frac{1}{\sqrt{Z_1^2 + \rho_{max}^2}} + \frac{\lambda_1}{\lambda_{21}}\left(\frac{1}{\sqrt{Z_3^2 + \rho_{max}^2}} + \frac{1}{\sqrt{Z_4^2 + \rho_{max}^2}}\right)\right)\right]^2} - \rho_{max}^2} \quad (7)$$

-continued $$Z_{22} = \frac{1}{\frac{1}{Z_1} + \frac{\lambda_1}{\lambda_{22}}\left(\frac{1}{Z_3} + \frac{1}{Z_4}\right)} \quad (8)$$

Figure 5:
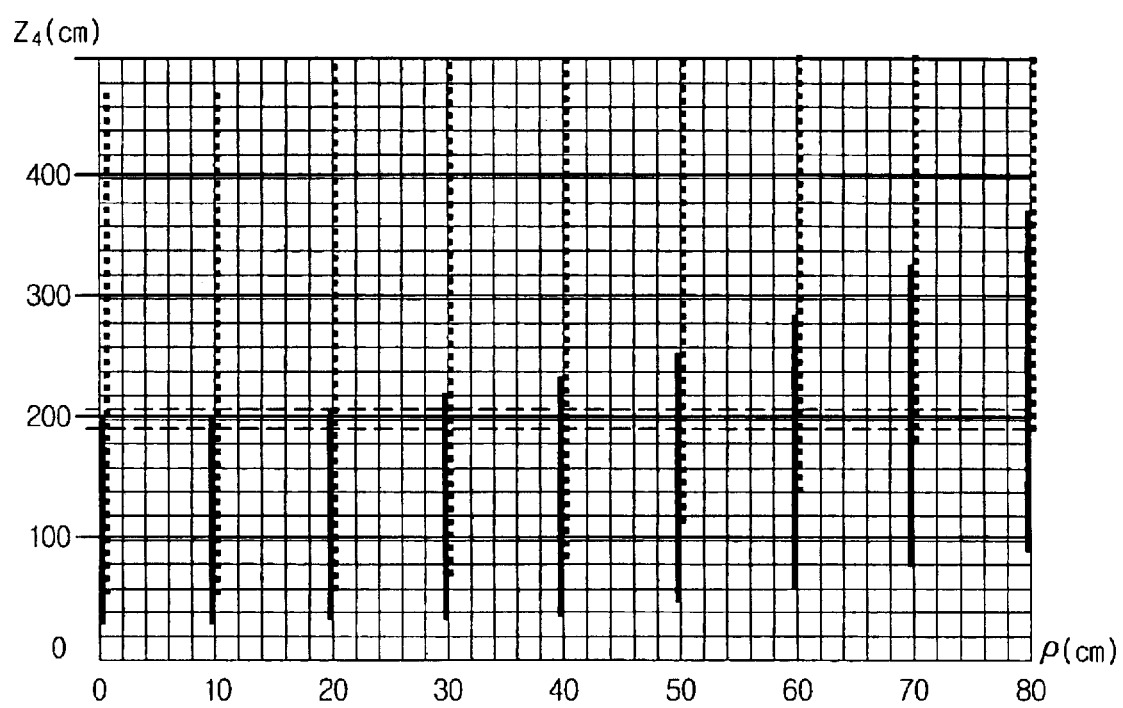
FIG. 5 is showing the overlapping of the red and blue diffuser images with the holographic screen as produced according to the present invention

FIG. 5 shows that the red and blue diffuser images are overlapped for all values of $\rho$ and the overlapping zone retains at position of 2 m forming this way the full color viewing zone.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. An apparatus for producing a holographic screen for displaying a stereoscopic or multiview color image by recording interference patterns on a photoplate located on xy-plane of three dimensional space, comprising:
    a laser for generating a light beam;
    a beam splitter for dividing the light beam into a reference beam and an object beam;
    a first mirror for reflecting the reference beam;
    a first lens locating on z-axis for focusing the reflected reference beam to form a diverging reference beam for the photoplate;
    a second mirror for reflecting the object beam;
    a second lens for forming the reflected object beam; and
    a diffuser having a length of $Z_{22}-Z_{21}$ disposed perpendicular to the photoplate and illuminated by said second lens,
    wherein $Z_{21}$, distance to the nearest point of the diffuser from xy-plane, $Z_{22}$, distance to the farthest point from xy-plane, are calculated from following equations:

$$Z_{21} = \sqrt{\frac{1}{\left[\frac{1}{\sqrt{Z_1^2 + \rho_{max}^2}} + \frac{\lambda_1}{\lambda_{21}}\left(\frac{1}{\sqrt{Z_3^2 + \rho_{max}^2}} + \frac{1}{\sqrt{Z_4^2 + \rho_{max}^2}}\right)\right]^2} - \rho_{max}^2} \quad (7)$$

$$Z_{22} = \frac{1}{\frac{1}{Z_1} + \frac{\lambda_1}{\lambda_{22}}\left(\frac{1}{Z_3} + \frac{1}{Z_4}\right)} \quad (8)$$

where $\lambda_1$ is the wavelength of the laser used for the holographic screen recording, $\lambda_{21}$ is the shortest wavelength of the displayed image, $\lambda_{22}$ is the longest wavelength of the displayed image, $Z_1$ is distance to the reference beam source from the XY-plane in the recording setup, $Z_3$ is distance from the projector to the holographic screen in the image projection setup, $Z_4$ is distance from the screen to the focusing point of the diffracted beams, and $\rho_{max}$ is distance from Z-axis of the farthermost point of the photoplate.

2. The apparatus in claim 1, wherein said diffuser is disposed along a system optical axis.

3. The apparatus in claim 1, wherein said diffuser is a narrow and elongate slit-shaped ground glass and its position for covering the entire spectral range of the projected image being determined by equation (7) and (8).

4. An apparatus for displaying stereoscopic or multiview color image on a holographic screen locating on xy-plane of three dimensional space, comprising:
    a projector for producing an image projection beam; and
    a holographic screen on x-y plane of a three-dimensional space, center of said holographic screen being disposed on y-axis, for diffracting the image projection beam to be collected on a focusing point,
    whereby the stereoscopic or multiview color image can be displayed on the focusing point at a distance $Z_4$ from said holographic screen by said projector disposed at a distance $Z_3$ from said holographic screen, if a view's eyes are placed at viewing zones being composed of superposed diffuser's real images of the different colors,
    wherein said holographic screen is made by using a narrow and elongate slit-shaped diffuser having a length of $Z_{22}-Z_{21}$ disposed perpendicularly to the holographic screen,
    wherein $Z_{21}$, distance to the nearest point of the diffuser from xy-plane, $Z_{22}$, distance to the farthest point from xy-plane, are calculated from following equations:

$$Z_{21} = \sqrt{\frac{1}{\left[\frac{1}{\sqrt{Z_1^2 + \rho_{max}^2}} + \frac{\lambda_1}{\lambda_{21}}\left(\frac{1}{\sqrt{Z_3^2 + \rho_{max}^2}} + \frac{1}{\sqrt{Z_4^2 + \rho_{max}^2}}\right)\right]^2} - \rho_{max}^2} \quad (7)$$

$$Z_{22} = \frac{1}{\frac{1}{Z_1} + \frac{\lambda_1}{\lambda_{22}}\left(\frac{1}{Z_3} + \frac{1}{Z_4}\right)} \quad (8)$$

where $\lambda_1$ is the wavelength of the laser used for the holographic screen recording, $\lambda_{21}$ is the shortest wavelength of the displayed image, $\lambda_{22}$ is the longest wavelength of the displayed image, $Z_1$ is distance to the reference beam source from the XY-plane in the recording setup, $Z_3$ is distance from the projector to the holographic screen in the image projection setup, $Z_4$ is distance from the holographic screen to the focusing point of the diffracted beams, and $\rho_{max}$ is distance from Z-axis of the farthermost point of the holographic screen.

5. A method of producing a holographic screen for displaying a stereoscopic or multiview color image, comprising:
    placing a photoplate on the x-y plane of a three-dimensional space, center of the photoplate being disposed on the y-axis on the distance of $H/2+h$ from the origin of a three-dimensional space, wherein H is the photoplate height (size in the y-direction) and h is distance of the photoplate boundary from the origin;
    splitting the laser beam into a reference beam and object beam, both beams being used to illuminate the photoplate surface;
    shaping the reference beam as spherical wave diverging from the point on the z-axis which is located a distance $Z_1$ from the origin of a three-dimensional space;
    shaping the object beam so to illuminate the photoplate through a elongated narrow strip-shaped diffuser disposed precisely along the z-axis; and
    recording the interference pattern, which is arising as a result of superposition of the reference wave with an object wave from diffuser on the photoplate, wherein to provide displaying of the color image in the bandwidth from $\lambda_{21}$ (shortest wavelength) up to $\lambda_{22}$ (the longest wavelength), the coordinates $Z_{21}$ and $Z_{22}$ of the diffuser end points are calculated from the following equations:

$$Z_{21} = \sqrt{\frac{1}{\left[\frac{1}{\sqrt{Z_1^2 + \rho_{max}^2}} + \frac{\lambda_1}{\lambda_{21}}\left(\frac{1}{\sqrt{Z_3^2 + \rho_{max}^2}} + \frac{1}{\sqrt{Z_4^2 + \rho_{max}^2}}\right)\right]^2} - \rho_{max}^2} \quad (7)$$

$$Z_{22} = \frac{1}{\frac{1}{Z_1} + \frac{\lambda_1}{\lambda_{22}}\left(\frac{1}{Z_3} + \frac{1}{Z_4}\right)} \quad (8)$$

where $\lambda_1$ is the wavelength of the laser used for the screen recording, $Z_3$ is distance from the projector to the screen in the image projection setup, $Z_4$ is distance from the holographic screen to a focusing point of the diffracted beams, and $\rho_{max}$ is distance from Z-axis of the farthermost point of the photoplate.

6. The apparatus in claim 5, wherein said diffuser is a narrow and elongate slit-shaped ground glass and its position for covering the entire spectral range of the projected image being determined by equation (7) and (8).

7. A method for producing a holographic screen by using a diffuser disposed along z-axis of three dimensional space and perpendicular to a photoplate on the xy plane of a three dimensional space, comprising:

determining a wavelength $\lambda_1$ of laser beam used for a holographic screen recording setup and a distance Z1 to a reference beam source from xy plane;

determining a shortest wavelength $\lambda_{21}$ and a longest wavelength $\lambda_{22}$ of an image to be displayed, a distance $Z_3$ from a projector to the holographic screen, and a distance $Z_4$ from the holographic screen to a focusing point of diffracted beams in an image projection setup;

calculating a distance $\rho_{max}$ from Z-axis of the farthermost point of the photoplate with size of B×H, wherein center of the photoplate is disposed on the y-axis on the distance of H/2+h from the origin of the three-dimensional space, where H is the photoplate height (size in the y-direction) and h is distance of the photoplate boundary from the origin;

calculating a distance $Z_{21}$ to the nearest point of the diffuser from xy-plane and a distance $Z_{22}$ to the farthest point from xy plane by using following equations:

$$Z_{21} = \sqrt{\frac{1}{\left[\frac{1}{\sqrt{Z_1^2 + \rho_{max}^2}} + \frac{\lambda_1}{\lambda_{21}}\left(\frac{1}{\sqrt{Z_3^2 + \rho_{max}^2}} + \frac{1}{\sqrt{Z_4^2 + \rho_{max}^2}}\right)\right]^2} - \rho_{max}^2} \quad (7)$$

$$Z_{22} = \frac{1}{\frac{1}{Z_1} + \frac{\lambda_1}{\lambda_{22}}\left(\frac{1}{Z_3} + \frac{1}{Z_4}\right)} \quad (8)$$

recording interference patterns on the photoplate by using the diffuser disposed along z-axis from $Z_{21}$ to $Z_{22}$ to produce a holographic screen.

8. The method in claim 7, wherein said step of recording interference patterns on the photoplate by using the diffuser disposed along z-axis from $Z_{21}$ to $Z_{22}$ to produce a holographic screen comprises:

placing the photoplate on xy plane of a three-dimensional space, center of the photoplate being disposed on the y-axis on the distance of H/2+h from the origin of a three-dimensional space;

splitting the laser beam into a reference beam and object beam, both beams being used to illuminate the photoplate surface;

shaping the reference beam as spherical wave diverging from the point on the z-axis which is located a distance $Z_1$ from the origin of a three-dimensional space;

shaping the object beam so to illuminate the photoplate through a elongated narrow strip-shaped diffuser disposed precisely along the z-axis; and recording the interference pattern, which is arising as a result of superposition of the reference wave with an object wave from the diffuser on the photoplate.

9. The method in claim 7, wherein said diffuser is a narrow and elongate slit-shaped ground glass and its position for covering the entire spectral range of the projected image being determined by equation (7) and (8).

* * * * *

UNITED STATES PATENT AND TRADEMARK OFFICE
CERTIFICATE OF CORRECTION

PATENT NO. : 6,912,074 B1
DATED : June 28, 2005
INVENTOR(S) : Jung-Young Son et al.

It is certified that error appears in the above-identified patent and that said Letters Patent is hereby corrected as shown below:

Column 1,
Line 44, "comers" should be -- corners --;

Column 3,
Line 51, "recording to setup" should be -- recording setup --;
Line 60, "disposed is a on the" should be -- disposed on the --.

Signed and Sealed this

Eleventh Day of October, 2005

JON W. DUDAS
*Director of the United States Patent and Trademark Office*